(12) United States Patent
Peppett

(10) Patent No.: US 6,749,001 B2
(45) Date of Patent: Jun. 15, 2004

(54) COMBINED DECORATIVE AND UTILITY UNIT

(76) Inventor: Robert Anthony Peppett, c/o Brastan s.r.o., Morasice 17, 569 51, Morasice u Litomysle (CZ)

( * ) Notice: Subject to any disclaimer, the term of this patent is extended or adjusted under 35 U.S.C. 154(b) by 0 days.

(21) Appl. No.: 09/952,765

(22) Filed: Sep. 10, 2001

(65) Prior Publication Data

US 2002/0017369 A1 Feb. 14, 2002

Related U.S. Application Data

(63) Continuation-in-part of application No. 09/715,848, filed on Nov. 15, 2000, now Pat. No. 6,497,268.

(30) Foreign Application Priority Data

Nov. 16, 1999 (GB) .............................. 9927027
Sep. 14, 2000 (GB) .............................. 0022540

(51) Int. Cl.[7] .............................................. E06B 3/30
(52) U.S. Cl. ................. 160/374.1; 160/351; 160/352; 312/3
(58) Field of Search ................ 160/378, 374.1, 160/377, 381, 371, 369, 405, 351, 352; 38/102.5, 102.4; 211/90.02, 90.03, 181.1, 84; 312/3, 4, 109

(56) References Cited

U.S. PATENT DOCUMENTS

| | | | | |
|---|---|---|---|---|
| 1,151,491 A | * | 8/1915 | Macdaniel | 312/3 |
| 1,152,644 A | * | 9/1915 | King | 312/3 |
| 1,916,022 A | | 6/1933 | Shull | |
| 3,211,089 A | | 10/1965 | Messerschmitt | 160/381 X |
| 3,482,343 A | | 12/1969 | Hamu | 38/102.5 |
| 3,494,405 A | | 2/1970 | Sandahl et al. | 160/378 X |
| 3,661,435 A | * | 5/1972 | Miller | 312/321 |
| 3,930,702 A | | 1/1976 | Pichowicz | 312/245 |
| 4,144,660 A | | 3/1979 | Lamb | 160/378 X |
| 4,190,974 A | | 3/1980 | Siler | 160/377 |
| 4,625,440 A | | 12/1986 | Dang et al. | 38/102.5 |
| 4,759,143 A | | 7/1988 | Pomerleau | 40/574 |
| 5,076,162 A | | 12/1991 | Goin | 160/374.1 X |
| 5,271,171 A | | 12/1993 | Smith | 38/102.5 |
| 5,368,378 A | | 11/1994 | Curtis | 312/204 |
| 5,531,258 A | | 7/1996 | Poulson et al. | 160/378 X |
| 5,588,725 A | | 12/1996 | Frank | 312/245 |
| 5,622,415 A | * | 4/1997 | Felsenthal et al. | 312/265.4 |
| 5,678,906 A | | 10/1997 | Riestra et al. | 312/204 |
| 5,992,070 A | | 11/1999 | Birnbaum | 40/603 |
| 6,142,589 A | * | 11/2000 | Wang | 312/6 |
| 6,497,268 B1 | * | 12/2002 | Peppett | 160/374.1 |

FOREIGN PATENT DOCUMENTS

| | | |
|---|---|---|
| EP | 0 137 970 A1 | 4/1985 |
| EP | 0 337 902 A1 | 10/1989 |
| EP | 0 551 058 A2 | 7/1993 |
| FR | 2 261 143 | 9/1975 |
| GB | 512530 | 9/1939 |
| GB | 612635 | 11/1948 |
| GB | 1192955 | 5/1970 |
| GB | 2232520 | 12/1990 |

* cited by examiner

*Primary Examiner*—David Purol
(74) *Attorney, Agent, or Firm*—Ladas & Parry (57) ABSTRACT

The invention provides a combined decorative and utility unit, which has a decorative screen assembly as its basic element. The screen assembly can be combined with other appliances to achieve a variety of utility purposes such as sun blinds, screen windows, window privacy partitions, decor wall panels, and decorative storage units. The screen assembly has a laminar member, preferably having a graphic display, attached to frame members. Relative positions of the frame members may be adjusted by a cam arrangement to vary tension in the laminar member. The screen assembly can be horizontally attached to a wall to work as a decor wall panel, or vertically attached to a wall as a divider or a poster. When combined with supporting elements, the screen assembly can stand on the ground to work as sun blinds or window privacy partitions. The screen assembly can also be hinged or slidably attached to a variety of containers such as a closet or a cabinet to have storage functions, or be slidably mounted to a window to have shielding functions.

54 Claims, 14 Drawing Sheets

COMBINED DECORATIVE AND UTILITY UNIT

The present application is a continuation-in-part of U.S. application Ser. No. 09/715,848, filed Nov. 15, 2000, now U.S. Pat. No. 6,497,268.

FIELD OF THE INVENTION

The present invention relates generally to a combined decorative and utility unit, and more particularly, to a decorative screen assembly, which can be used for a variety of utility purposes such as sun blinds, screen windows, window privacy partitions, decor wall panels, and decorative storage units.

BACKGROUND OF THE INVENTION

A common type of decor wall panel has a drawing or a picture printed on a relatively flexible panel of material, typically hardboard, which is provided with a surrounding frame by which it gains rigidity.

Such decor wall panels or framed drawings are usually for decoration only, and do not provide utility functions. Since they are rigid and of a fixed size, it is difficult to combine or adapt them with other appliances that have utility functions. Moreover, such decor wall panels or framed drawings are relatively heavy and large in dimension, thus making them difficult to transport.

A number of other home and office appliances have rigid panels and provide certain utility functions, such as sun blinds, window privacy partitions, doors or covers for cabinets or closets. These appliances, however, are usually not decorated. Moreover, they can also be heavy and large in dimension and difficult to transport. Conventionally used materials for cabinet or closet doors are composed from heavily compressed or laminated timber products, which are relatively expensive and difficult to handle.

A number of proposals have been made in the past for providing various types of utility units which are also decorative. For example, it has been known for many years to provide the lid of a storage unit, such as a box or trunk, with decoration of one sort or another, such as a graphical design or carving. It is also known to have wall mounted storage units, such as cupboards for various uses, e.g. kitchen cupboards and bathroom cabinets.

While such known types of appliances are perfectly adequate and satisfactory in many domestic and office environments, they are often bulky, heavy, and expensive. Further, it is difficult to replace such appliances when they are damaged or out of fashion. It is also difficult to change their size to fit into available space or change their decor to match decorations in other furniture.

SUMMARY OF THE INVENTION

The present invention is concerned with providing a combined decorative and utility unit that overcomes or minimizes the disadvantages discussed above, and at the same time provides versatility of design and adaptability to multi-functional use.

One object of the invention is to provide a combined decorative and utility unit that is simple and easy to use.

Another object of the invention is to provide a combined decorative and utility unit that is light in weight, easy to handle and to transport.

Another object of the invention is to provide a combined decorative and utility unit that is economical in cost and manufacture.

Another object of the invention is to provide a combined decorative and utility unit that can be assembled when in use and taken apart for easy storage and transportation.

Another object of the invention is to provide a combined decorative and utility unit that can be changed in size to fit into available space.

Another object of the invention is to provide a combined decorative and utility unit whose decoration can be changed or adjusted.

Another object of the invention is to provide a combined decorative and utility unit that allows ventilation and partial passage of light.

One important feature of the present invention is a decorative screen assembly, which has a laminar or sheet member attached to a surrounding frame. The laminar or sheet member preferably has a graphic display for decorative purpose. In a preferred embodiment, the surrounding frame contains four frame members to form a rectangular shape. Two of the frame members are attached to the laminar member when manufactured. The other two frame members are part of the assembly and can be connected to the first two frame members through a cam arrangement when assembled. Relative positions of the frame members may be adjusted to vary tension in the laminar member and also to change size of the combined decorative and utility unit. When packaged for sale, the assembly may include a set of laminar members in different sizes and/or graphics so that different screens can be formed.

This decorative screen assembly can be combined with a variety of units such as household appliances to achieve a variety of functions. For example, when combined with attachment means the screen can be horizontally attached to a wall to work as a decor wall panel, or vertically attached to a wall as a divider or a poster. When combined with supporting means, the screen can stand on the ground to work as sun blinds or window privacy partitions. The screen can be placed on the ground to work as carpet, ground decoration, or for camp uses. The screen can be attached to one or more sticks to be used as flags or posters. The screen assembly can be adapted to a map by replacing the laminar member with a map, so that the map can both be rolled up and be displayed in a frame. The screen assembly can be used as roll away panels such as exhibition stands and mini-billboards in the exhibition industry and fence panels in the garden fence industry. These roll away panels are very light in weight and can be easily carried by a person or transported in a car. The screen can also be hinged or slidably attached to a variety of containers such as a closet or a cabinet to have storage functions, or be slidably mounted to a window to have shielding functions.

The combined decorative and utility unit can additionally have one or more of the following features:

i. the laminar member is translucent;
ii. the laminar member allows ventilation;
iii. the laminar member is made from recyclable material; and/or
iv. means for illuminating the inside of the container and the rear surface of the laminar member.

BRIEF DESCRIPTION OF THE DRAWINGS

The objects and advantages of the invention will become more apparent and more readily appreciated from the following detailed description of the presently preferred exemplary embodiments of the invention, taken in conjunction with the accompanying drawings, of which.

DETAILED DESCRIPTION OF THE INVENTION

I. The Decorative Screen Assembly

1. The Preferred Embodiment

Figure 1:
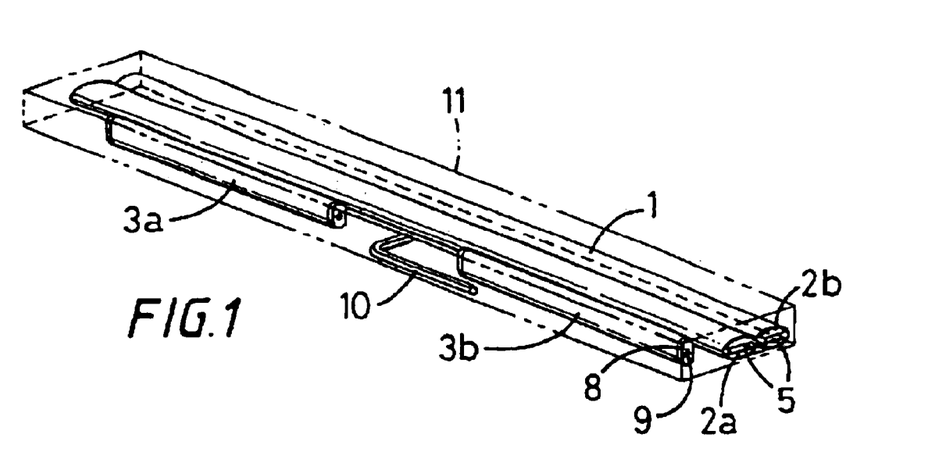
FIG. 1 illustrates a screen kit according to a preferred embodiment of the decorative screen assembly.

A basic element of the combined decorative and utility unit is a decorative screen assembly that can be easily adapted to a variety of functions. Such decorative screen assembly can have many variations in shape, structure, and design. A preferred, exemplary application of the screen assembly is a rectangular screen which would be purchased in the form of the kit illustrated in FIG. 1.

As shown in FIGS. 1 to 5, the screen comprises a roll of laminar member 1, which is mounted between and which can be rolled up with two longitudinal frame members 2a and 2b, which preferably are retained in pockets 4 formed on two opposing longitudinal sides of the laminar member 1. The kit also includes two loose transverse frame members 3a, 3b and an Allen key 10. The whole kit is preferably contained in a box 11 for storage and marketing purposes.

Figure 2:
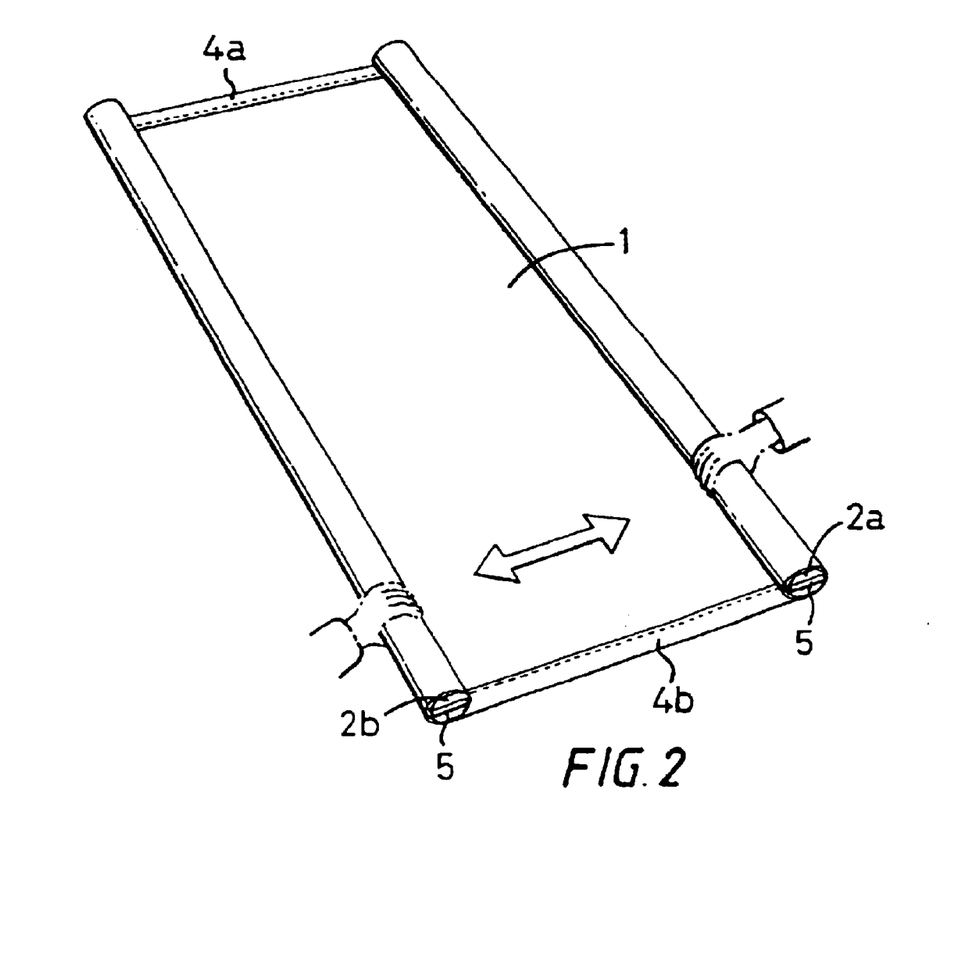
FIG. 2 illustrates the screen kit of FIG. 1 in a first partially assembled condition.

In order to assemble the frame, the laminar member 1 is unrolled from around the two longitudinal frame members 2a and 2b, as shown in FIG. 2. The exposed ends of laminar member 1 have pockets 4a, 4b, 4c and 4d formed in them.

Figure 3:
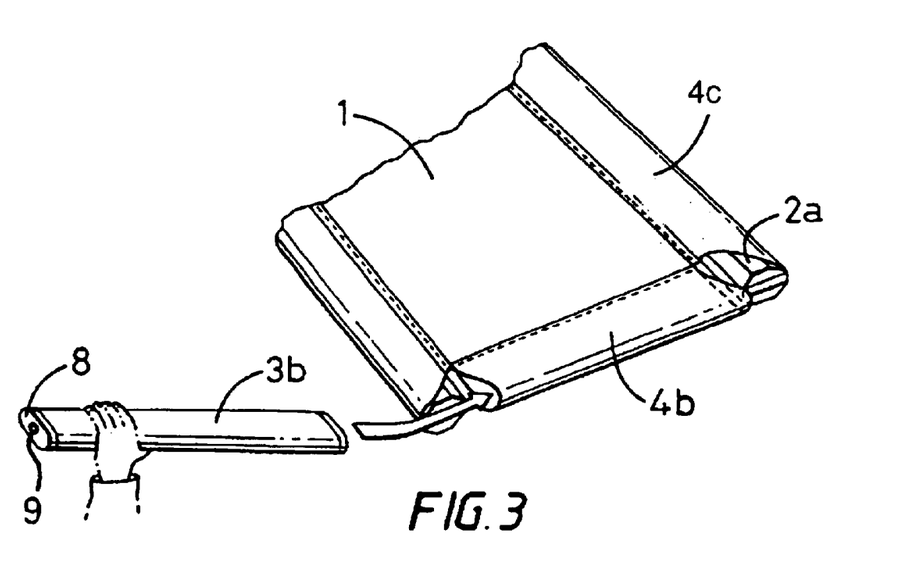
FIG. 3 illustrates the screen kit of FIG. 1 in a more advanced partially assembled condition.

Having unrolled the laminar member 1, the two transverse frame members 3a and 3b are then inserted into the pockets 4a and 4b in the manner illustrated in FIG. 3. The ends of the longitudinal frame members 2a, 2b and the transverse frame members 3a, 3b may have mechanisms or arrangements by which those ends can be connected to one another and also preferably have mechanisms or arrangements by which the overall peripheral length of the frame and the tension in the laminar member 1 may be adjusted.

Figure 4:
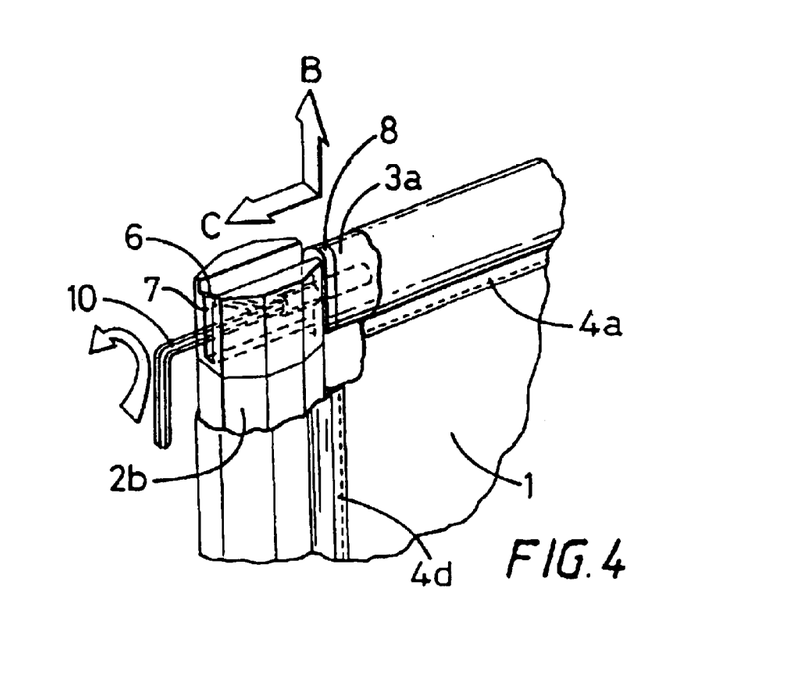
FIG. 4 is a detail on an enlarged scale of a corner of the screen of FIG. 1 illustrating the assembly of that corner.
Figure 5:
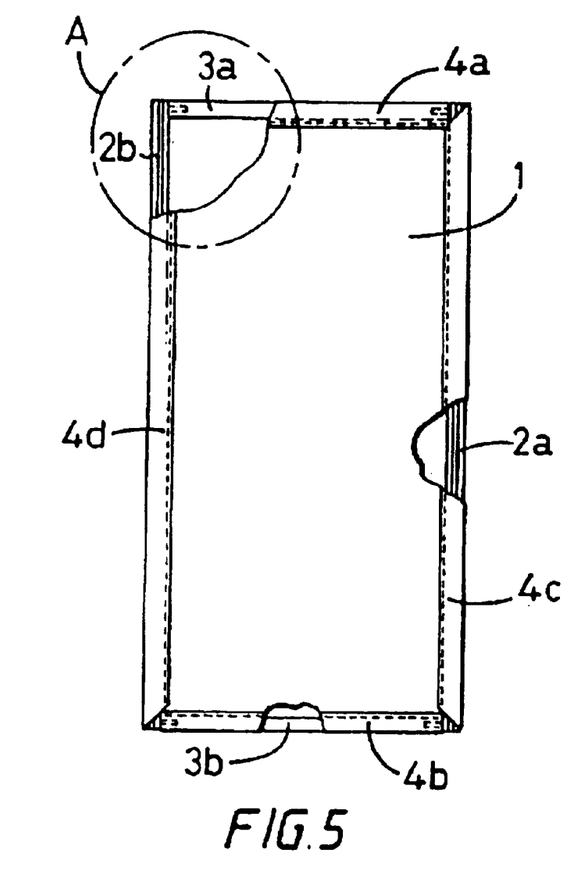
FIG. 5 is a view of the fully assembled screen of FIG. 1.
Figure 6:
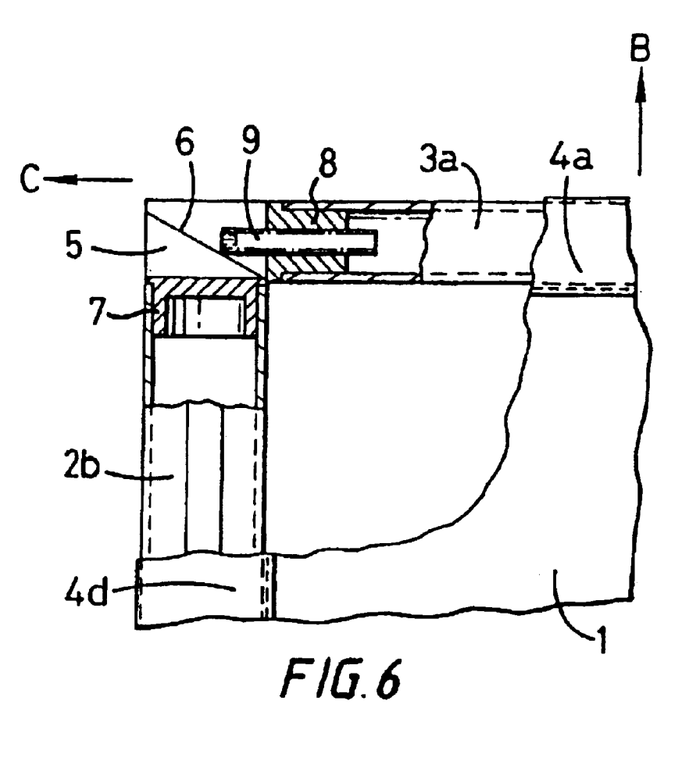
FIG. 6 is an enlarged sectional view illustrating the corner identified by 'A' in FIG. 5.
Figure 7:
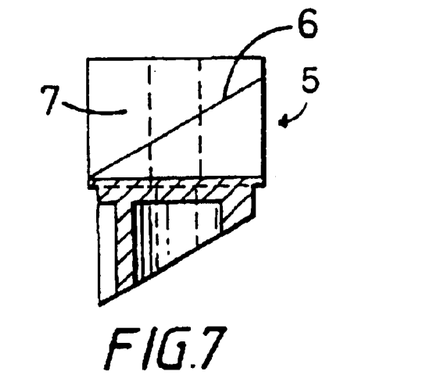
FIGS. 7 to 10 illustrate the cam member four of which form part of the corner connections of the embodiment of FIG. 1.
Figure 8:
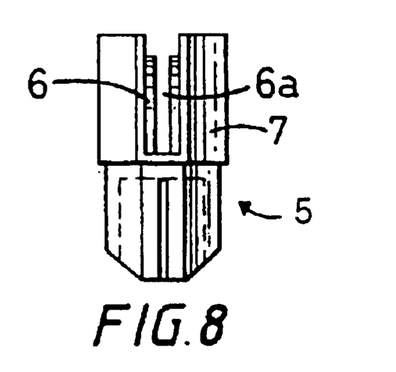
Figure 9:
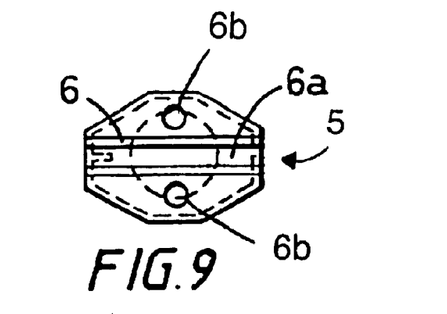
Figure 10:
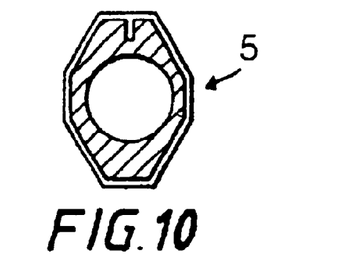
Figure 11:
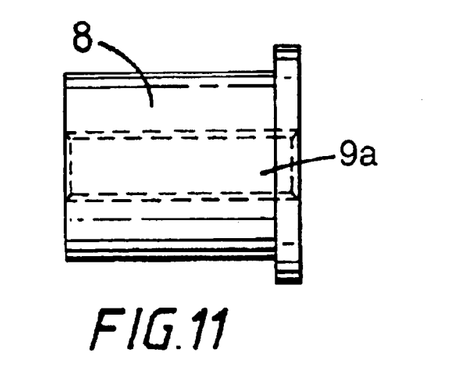
FIGS. 11 to 13 illustrate the screw-mounting member which forms the other part of the corner connection of the embodiment of FIG. 1.
Figure 12:
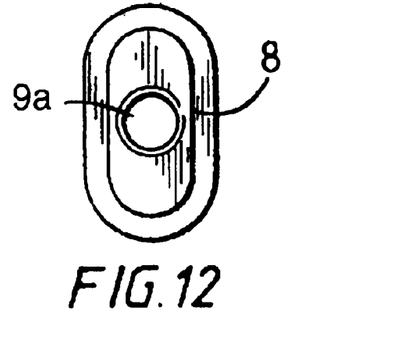
Figure 13:
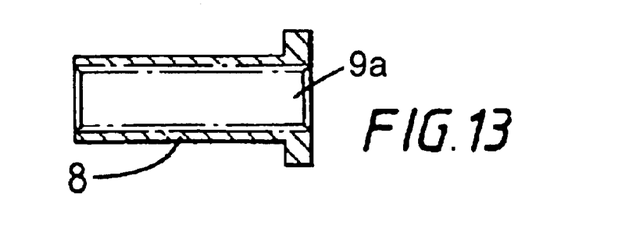

These arrangements are illustrated in more detail in FIGS. 4 and 6. FIG. 5 shows the screen in its final assembled configuration. FIGS. 4 and 6 illustrate the connecting arrangements at each of the four corners, for example, as indicated by reference number 'A' in FIG. 5.

Each of the four connecting arrangements preferably includes a cam member 5 (see FIGS. 7–10), which fits into the open tubular end of a longitudinal frame member 2, and an end cap 8 which fits in the end of an adjacent tubular transverse frame member 3.

The cam member 5 has an inclined cam surface 6, which is integral with a spigot member 7, the latter preferably being adapted to force-fit into an end of the tubular longitudinal frame member 2.

The cam surface 6 is provided with a slot 6a through which an Allen key 10 may be temporarily inserted to engage the end of a captive screw 9 which is threaded into a threaded hole 9a of the end cap 8.

The captive screw 9 is initially inserted fully within the end cap 8 so that the left-hand end of the screw, as viewed in FIG. 6, is flush with the left-hand end of the end cap 8. After the frame members have been located in their respective pockets 4, the end of the screw member 9 is engaged by the Allen key 10 and rotated so as to make it progressively emerge from the end cap 8 and contact the cam surface 6, as shown in FIG. 6. As the screw 9 is progressively drawn out of the member 8, the left-hand side of the screw member 9 will ride up the cam surface 6 which will have the effect of moving the transverse frame member 3a in FIG. 6 in the direction of the arrow 'B', and the frame member 2b in the direction of the arrow 'C' to thus tension the laminar member 1 forming the screen.

By adjusting each of the screws 9 associated with each of the four corners of the frame, the laminar member 1 can be put into position with the tension being more or less evenly distributed along the frame members so as to give the laminar member a smooth appearance. The two components 6 and 8 are shown in more detail in FIGS. 7 to 10 and 11 to 13 respectively.

The frame members are preferably made from metal materials such as aluminum so that the frame is strong but light in weight. The laminar member 1 may be made from woven materials and is preferably translucent. The front surface of the laminar member may include a graphic design or picture. Such graphic design or picture may be applied by a number of ways, such as screen printing, hand drafting, or attaching pre-printed graphic designs to the front surface. The kit shown in FIG. 1, when packaged for sale, could also include a number of designs (e.g. in the form of stencils or transfers) and the necessary coloring materials such as paints, so that purchasers can select and execute the graphic design at their own choices.

2. Variations of the Decorative Screen Assembly

Variations may be made to the design of this cam arrangement without departing from the scope of the present invention. For example, the detailed design of cam member 5 may vary as might the cam surface 6. Moreover, a different arrangement for mounting the screw 9, or its equivalent, could be employed, which operates in substantially the same way or a suitable way as that described and shown in FIGS. 4 and 6.

Arrangements can be made to adjust the length of some or all of the frame members so that size of the screen can be adjusted. For example, each of the two transverse frame members 3a or 3b can have a structure in which two rods are slidably attached to each other so that length of the frame member 3a or 3b may be adjusted.

Figures 23, 24:
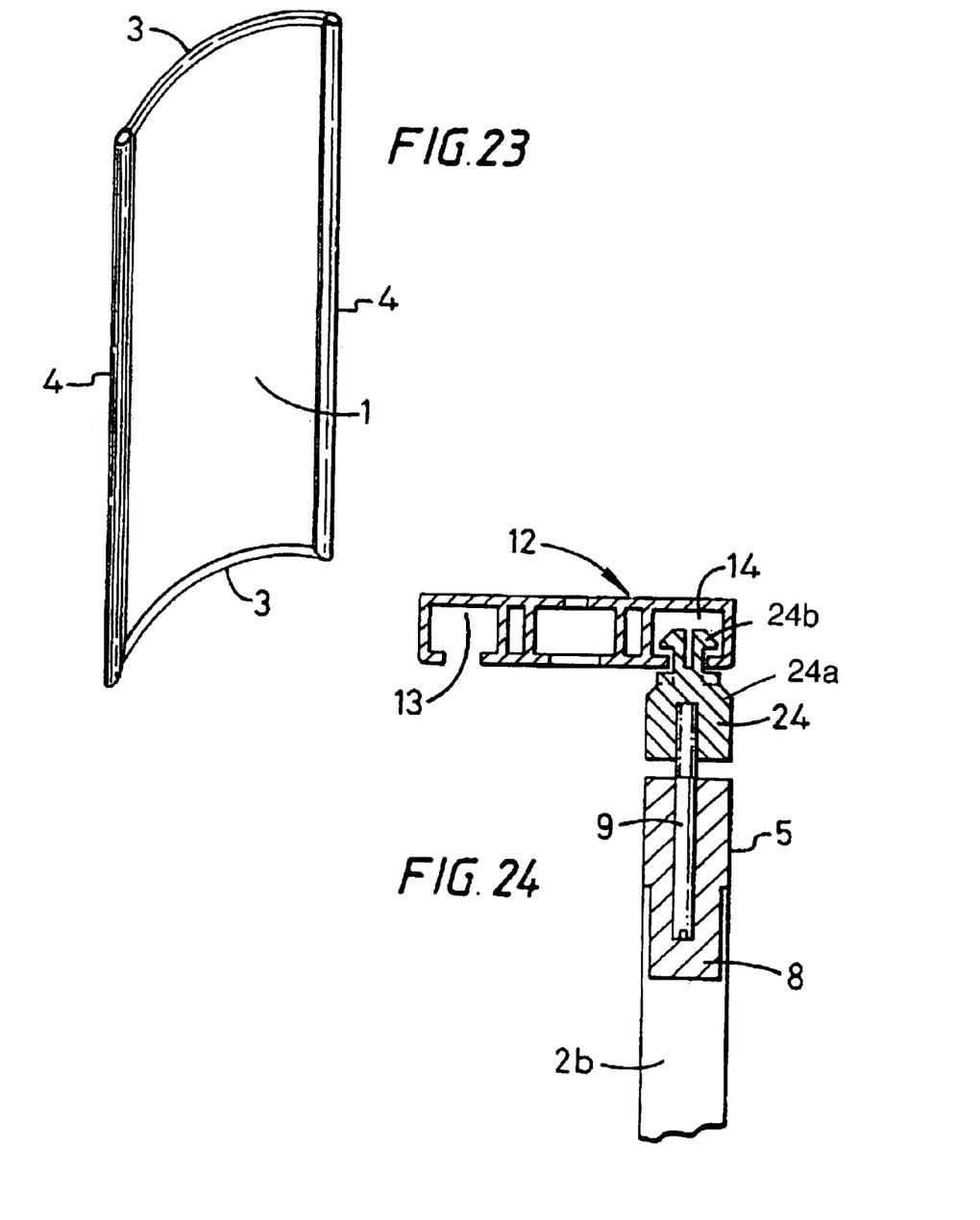
FIG. 23 is a perspective view of a curved embodiment of the screen assembly.
FIG. 24 illustrates an alternative to the arrangements of FIGS. 17 and 18 for slidably connecting a screen to the track of FIGS. 14 and 15.

The screen is not necessarily of the rectangular shape. It can has any other geometric shape such as a triangle or a circle. It can also be designed as a three-dimensional shape. For example, FIG. 23 shows that the screen is curved instead of being flat. The principle of construction is exactly the same as in the rectangular embodiment. The only difference is that the transverse frame members 3 are curved instead of straight.

II. Applications of the Decorative Screen Assembly

1. Sliding Arrangements

The decorative screen assembly can be combined with many different appliances to achieve a variety of functions. For example, one or more screens shown in FIGS. 1 to 5 can be combined with sliding tracks, as illustrated by FIGS. 14 to 18. Typical uses for such arrangement would be sliding doors for wardrobes or closets, or sliding screen windows.

Figure 14:
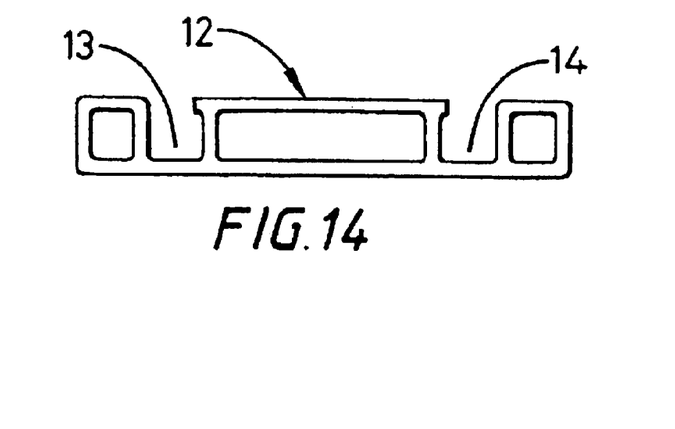
FIGS. 14 and 15 are two views of a track upon which and along which the embodiment of FIG. 1 may be slidably mounted.
Figure 15:
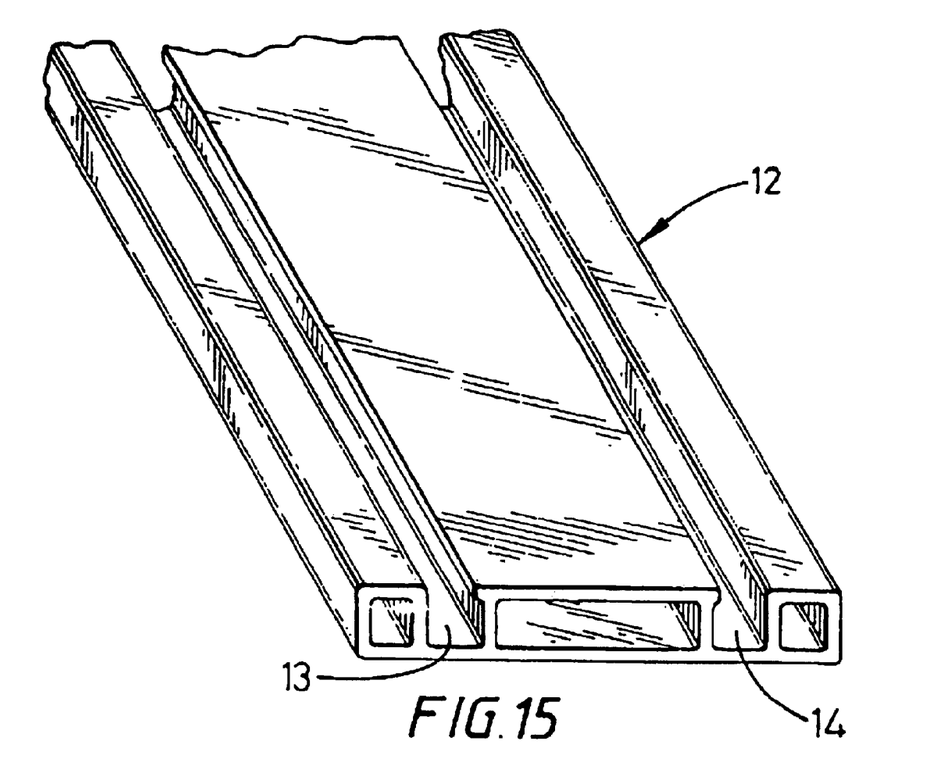
Figures 16, 17, 18:
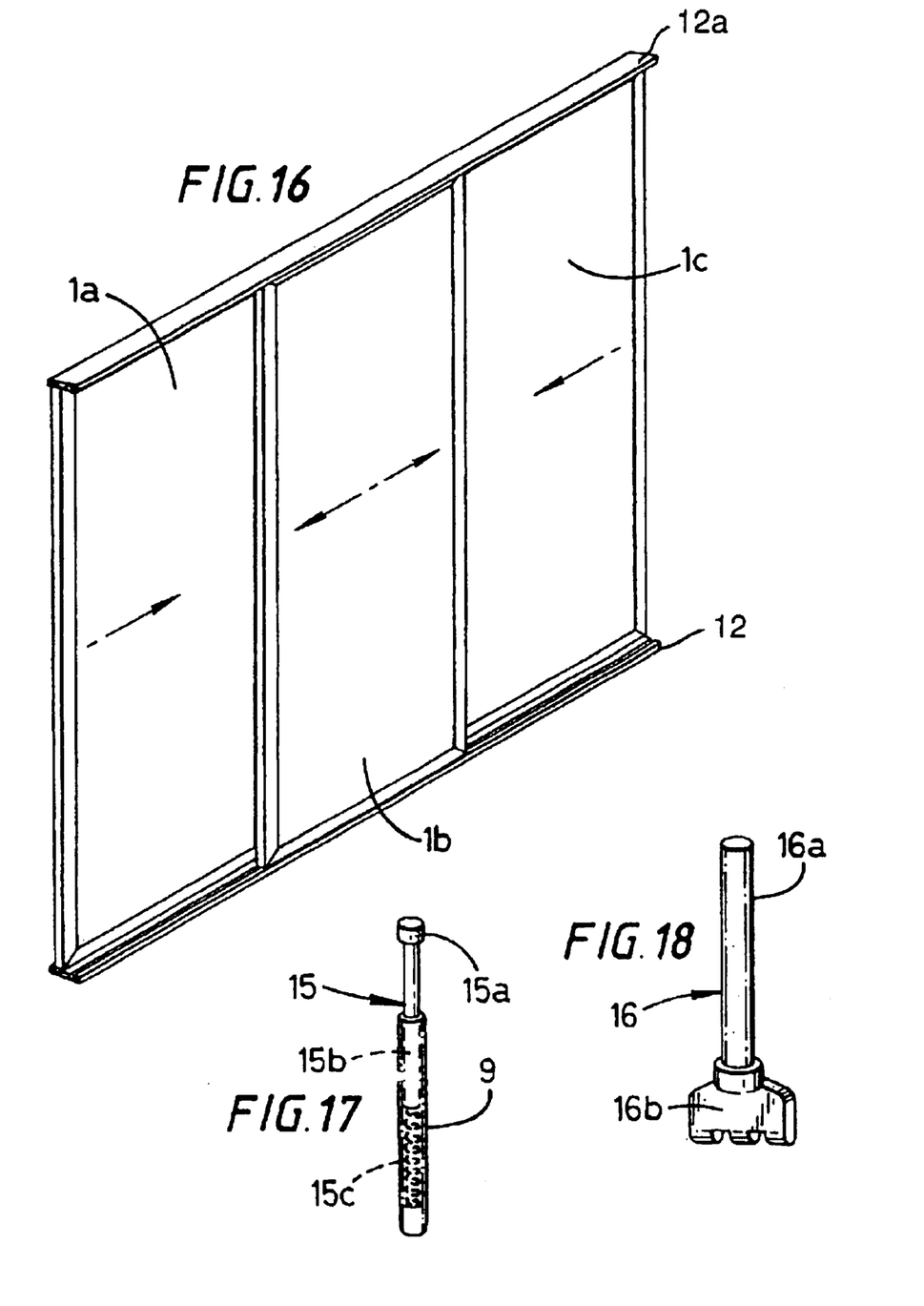
FIG. 16 shows an assembly of screens each having the construction of FIGS. 1 to 13.
FIG. 17 illustrates a top guide for use with the screen assembly of FIG. 16.
FIG. 18 illustrates a bottom runner for use with the screen assembly of FIG. 16.

The sliding track is illustrated in FIGS. 14 and 15, which preferably has a plastic extrusion 12 and two channels 13 and 14, to slidably accommodate two screens. FIG. 16 illustrates an arrangement which employs three screens 1a, 1b, and 1c, each of which essentially has the structure as shown in FIGS. 1 to 5. The screens 1a, 1b, and 1c are slidable with respect to one another on a sliding track 12, which essentially has the structure as shown in FIGS. 14 and 15.

For this embodiment, the top of each screen 1a, 1b, or 1c is preferably provided with a spring-loaded guide peg 15 as shown in FIG. 17. Each peg 15 has a head 15a, which runs in an upper track 12a, and a lower end 15b, which engages a coil spring 16 which is housed in a cavity formed in the screw 9.

Also in this embodiment, the bottom end of each screen 1a, 1b, and 1c is preferably provided with a bottom runner 16 shown in FIG. 18. Each bottom runner 16 consists of a screw thread 16a and a head 16b. The head 16b is designed to slide within the channel 13 or 14 in the track 12.

An alternative embodiment of the sliding arrangement is shown in FIGS. 24 to 29. This arrangement does not have the peg 15 and bottom runner 16. Instead, it provides a common runner guide 24 with a body portion 24a and a split-head portion 24b. A screw 9 is engaged into the body portion 24a through its threaded end. The split-head portion 24b is engaged into a channel 14 of the track 12. Such tracking arrangement can be mounted on both ends of the screen frame.

2. Free-Standing Screens

The screen can also be used as a free-standing item. Typical uses for such an embodiment would be sun blinds, window privacy partitions, dividers, or posters. An embodiment of such a use is illustrated in FIGS. 19 to 22.

Figures 19, 20:
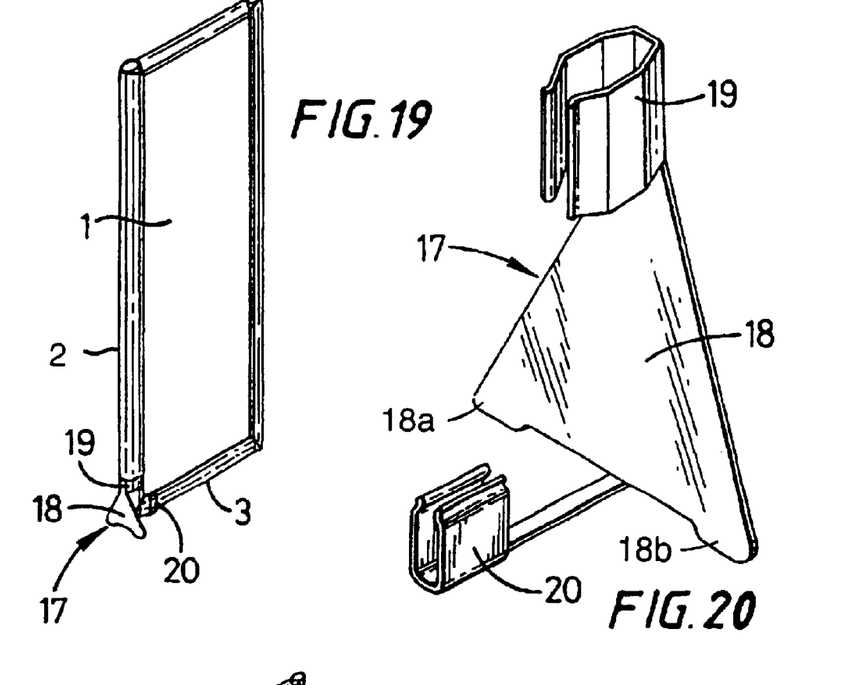
FIG. 19 illustrates a free standing embodiment of the screen.
FIG. 20 is a perspective view on an enlarged scale of the hinged clip illustrated in FIG. 19.

The screen 1 is provided with two feet 17 (only one is shown). Each foot 17 has a web 18 and two socket or clip portions 19 and 20, located at substantially ninety degrees to one another. The socket or clip 19 is adapted to fit around and grip the longitudinal frame member 2 and the socket or clip 20 is adapted to slide around and grip the transverse frame member 3. The feet 17 are preferably made from pressed steel, but other materials such as plastics could be used.

The web 18 is provided with two feet extensions 18a and 18b which would sit on a floor when the screen is in use. A similar foot would be provided at the other end of the transverse frame member 3.

Figure 21:
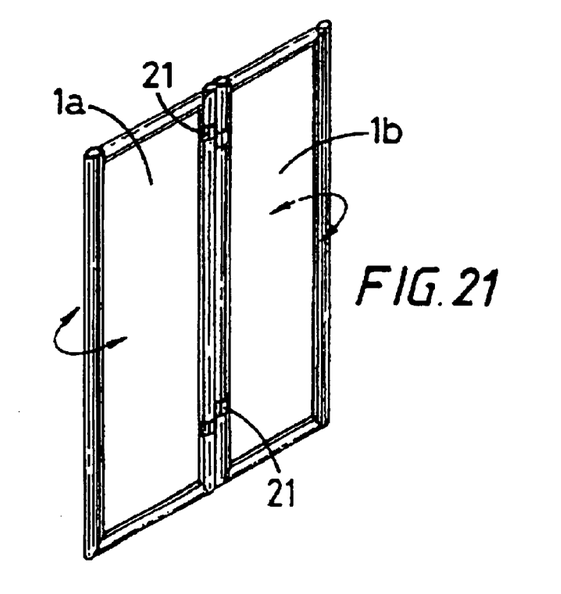
FIG. 21 is a variation of the embodiment of FIG. 19.
Figure 22:
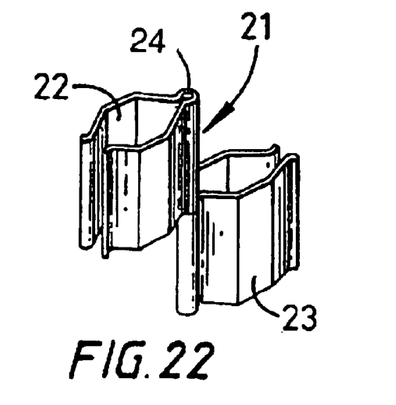
FIG. 22 is a view similar to FIG. 20 of the hinged clip shown in FIG. 21.

FIGS. 21 and 22 illustrate an embodiment in which two screens, 1a and 1b, are hinged together by a hinged clip 21. The hinged clip 21 has two socket-like members 22 and 23 which are mounted on a common hinge pin 24, as shown in FIG. 22.

3. Combining the Screen with Storage Units

Figure 25:
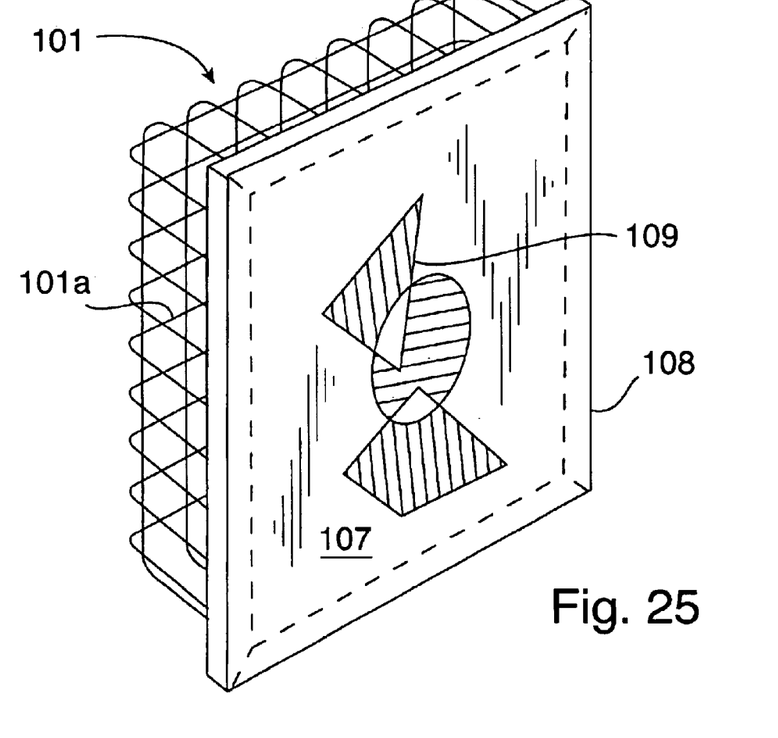
FIG. 25 illustrates that the screen assembly works as a hinged door for a storage unit, with the door closed.
Figure 28:
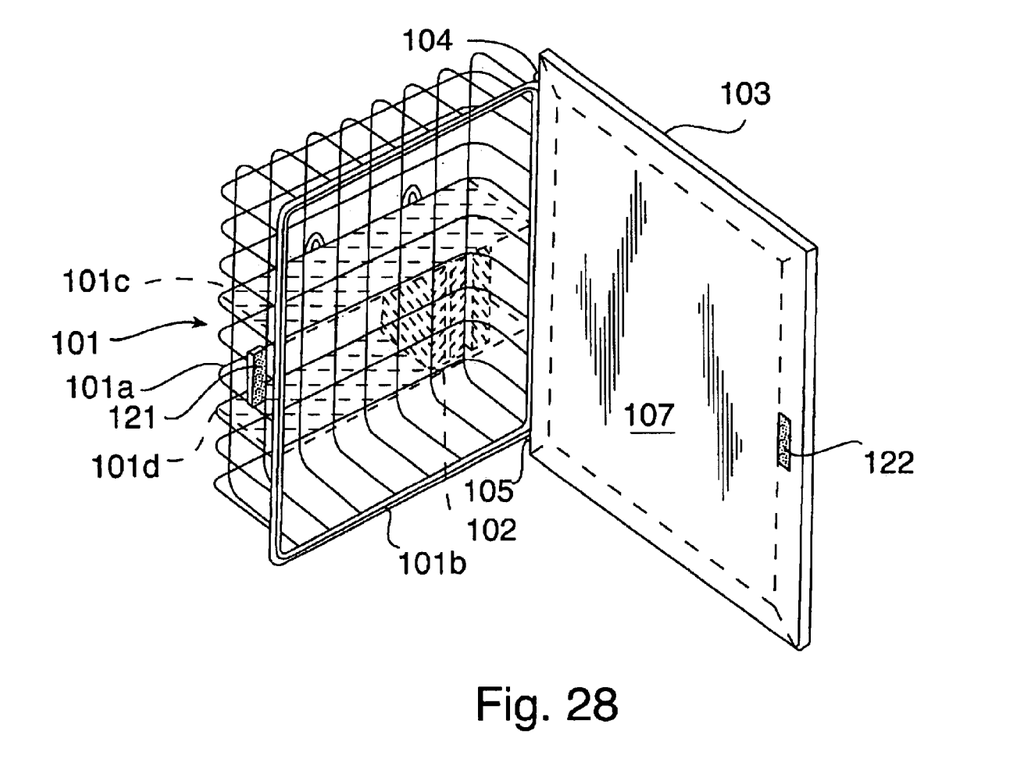
FIG. 28 is a view similar to FIG. 25 showing the unit with the door open.

The decorative screen assembly as illustrated in FIGS. 1 to 5 can be combined with a variety of storage units. One preferred embodiment of the present invention combines the screen with a hollow container 101 made of wire framework, in which the screen works as a hinged door 103, as illustrated by FIGS. 25 and 28. The container 101 has a base 101a and a front frame 101b. The base 101 a has two wire members 101c and 101d, which act as shelves. The container is light in weight but can carry a variety of household or office objects. The door 103 is hinged to one side of the front frame 101b. The opposite side of the front frame 101b has a catch arrangement to hold the door in its closed position. In this embodiment the catch arrangement has two patches of VELCRO™ 121 and 122 mounted on the frame 1b and the door 3, respectively.

Figures 26, 27:
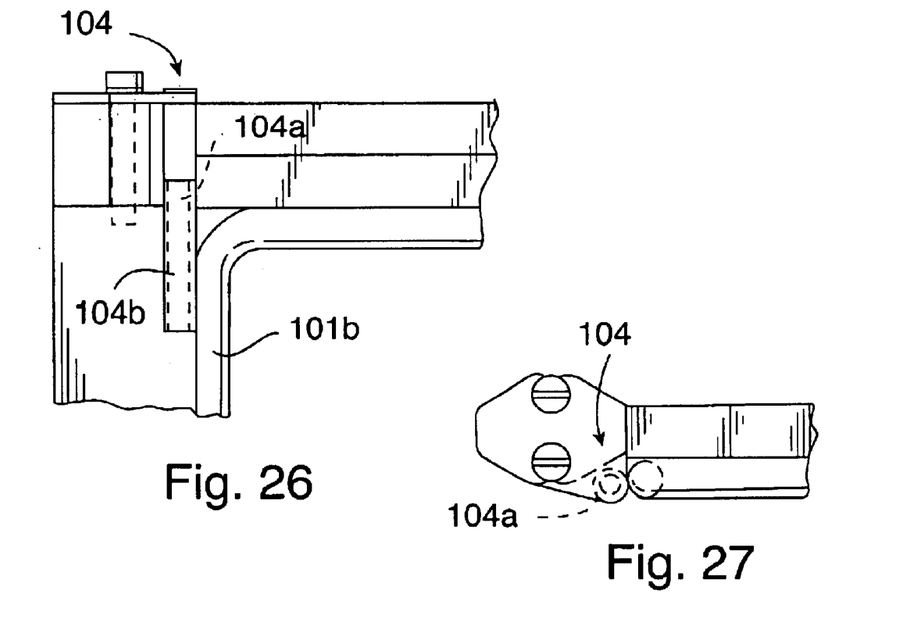
FIG. 26 is an enlarged fragmentary view illustrating the detail of the hinge construction of the embodiment in FIG. 25, by which the door of the unit is hinged to the wire framework container.
FIG. 27 is a plain view of FIG. 26.

The door 103 is hinged to the front frame 101b through two hinges 104 and 105. FIGS. 26 and 27 illustrate the hinges in more detail. Hinge 104 has a male member 104a and a female member 104b. The female member 104b has an internally threaded tube welded to the front frame 101b of the wire container 101. The front surface 107 of the door 103 is provided with a graphic design or picture 109.

The unit of this embodiment could be sold to end users ready assembled, or as a kit for self-assembly. In the former case, the door 103 would already have been assembled.

Preferably, as illustrated in FIG. 25, the door 103 is of larger area than the front opening of the wire container 101, so that when the door is closed it will conceal the wire container not only when the unit as a whole is viewed centrally or at right angles but also from the side view.

FIGS. 29 to 32 illustrate variations for the container or storage unit.

Figure 29:
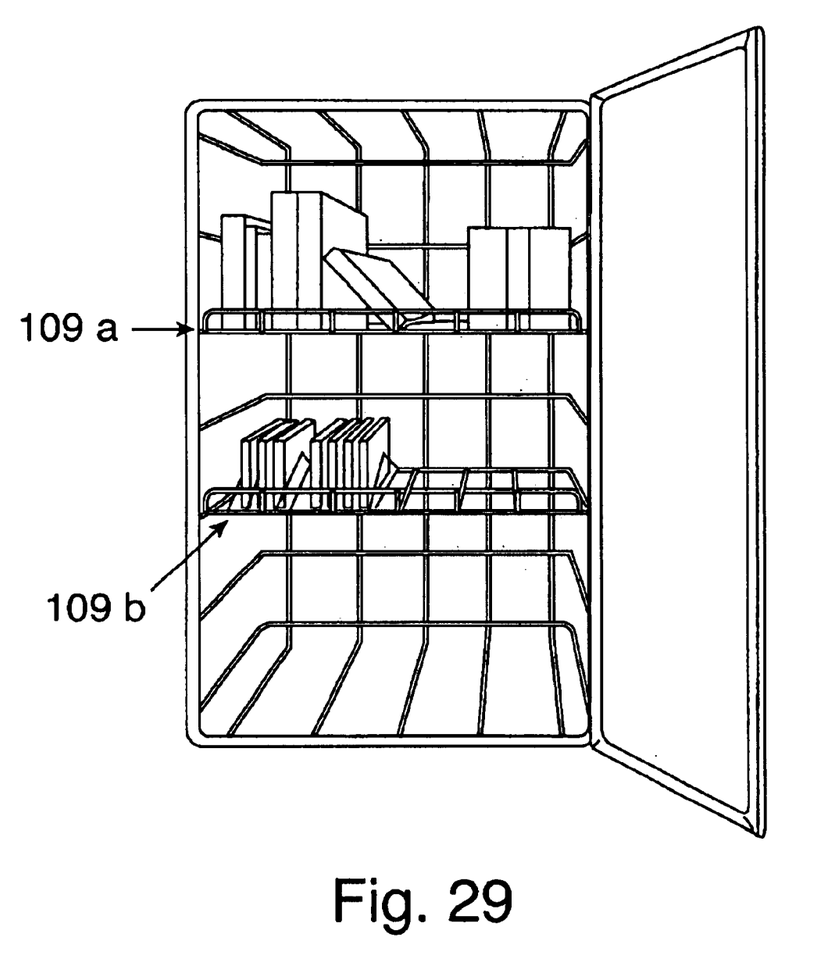
FIGS. 29–31 illustrate a variation of the embodiment in FIG. 25, with different objects being stored therein.

FIG. 29 illustrates a removable and adjustable book shelf and an organization rack to suit common container of audio-visual software such as compact or DVD discs.

Figure 30:
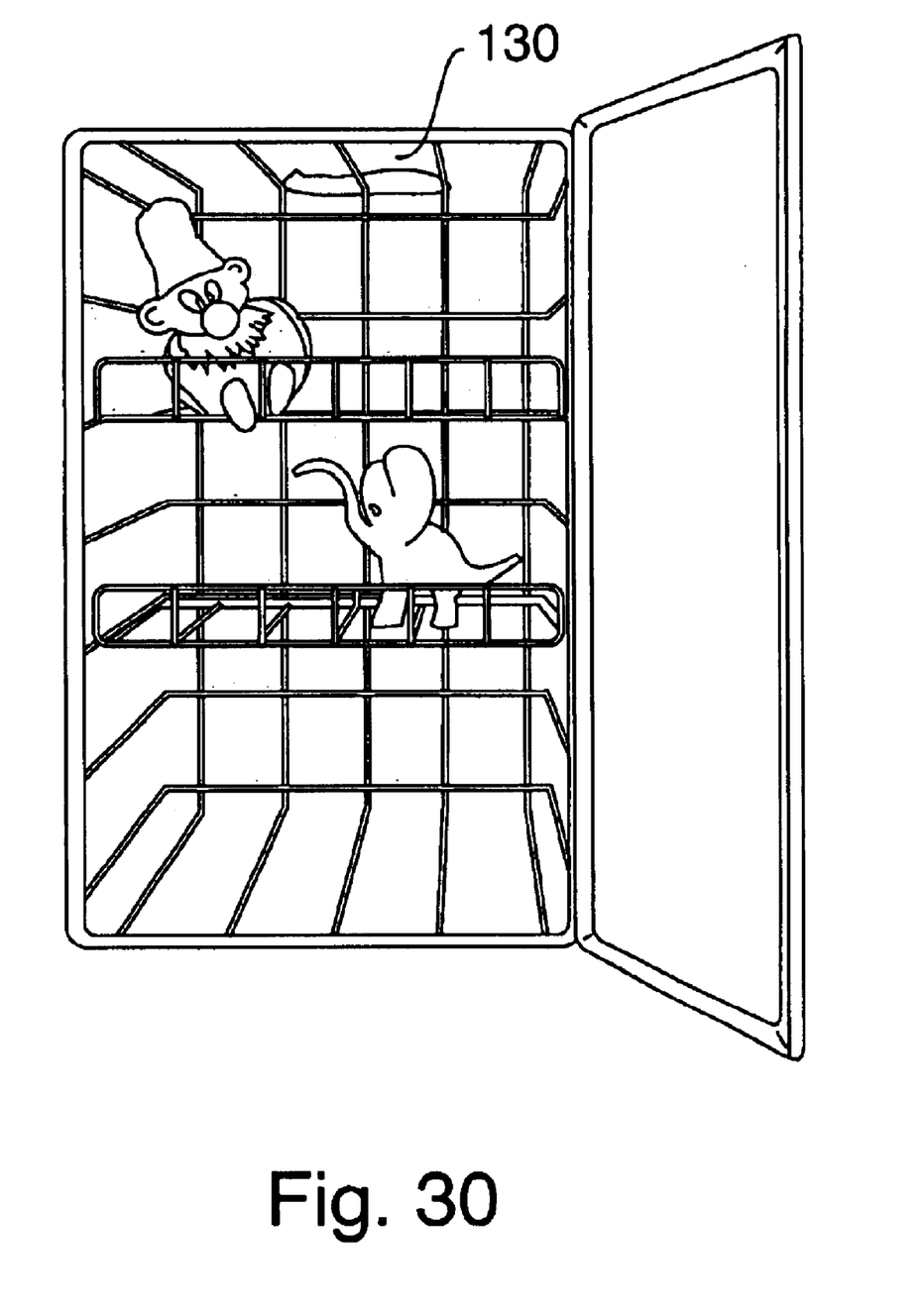

FIG. 30 illustrates removable and adjustable storage baskets.

Figure 31:
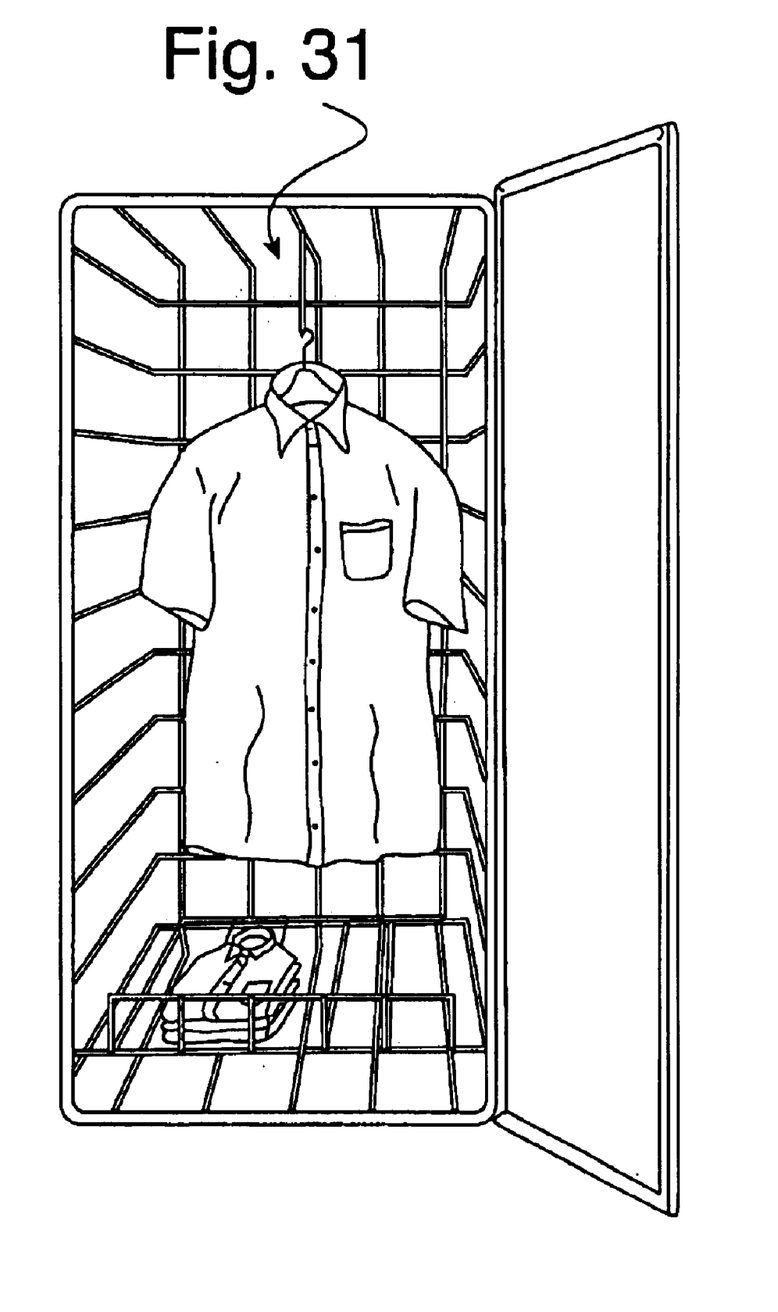
Figure 32:
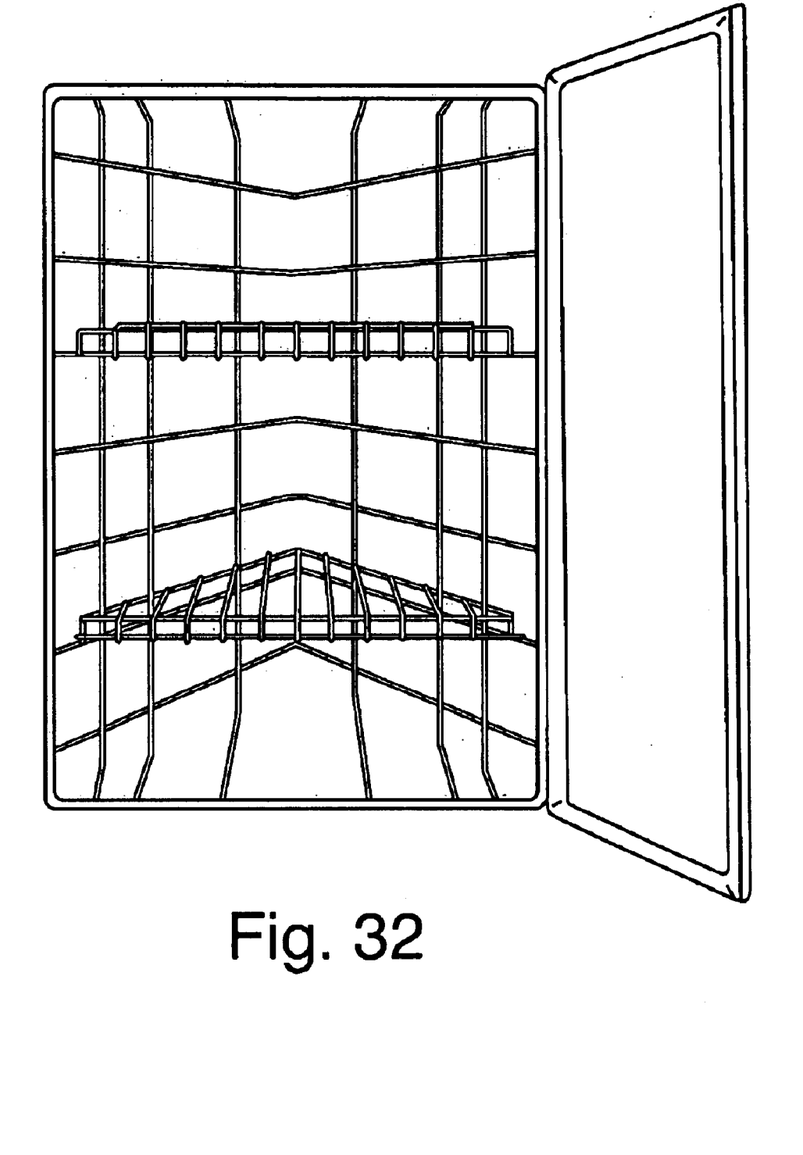
FIG. 32 is another variation of the embodiment in FIG. 25.

FIG. 31 illustrates a proportionately longer and deeper variant of the storage unit with a hanging rail and shelf for the purpose of providing aired and ventilated enclosure for clothing;

FIG. 32 illustrates a variation of the storage unit constructed to fit within the corner of walls which meet at an angle of ninety degrees.

A key feature of this embodiment is that both the container and the screen door are of lightweight construction. This is achieved because (a) the container is made of relatively thin, but strong metal wires; and (b) the screen door has a relatively light frame and a flexible laminar member which again is light in weight.

It can be arranged to install lights or illuminating means 130 inside the container, such as illustrated by FIG. 35, for illuminating the inside of the container and the rear surface of the door.

The unit described in this embodiment is particularly useful for homes and offices where spaces are small, thus the need for combined decorative and storage units.

4. Other Uses

Other than the embodiments disclosed above, there are many other possible uses for the decorative screen assembly. For example, the screen can be horizontally attached to a wall to work as a decor wall panel, or vertically attached to a wall as a divider or a poster. The screen can be placed on the ground to work as carpet, ground decoration, or for camp uses. The screen can be attached to one or more sticks to be used as flags or posters. The screen assembly can be adapted to a map by replacing the laminar member with a map, so that the map can both be rolled up and be displayed in a frame. The screen assembly can be used as roll away panels such as exhibition stands and mini-billboards in the exhibition industry and fence panels in the garden fence industry. These roll away panels are very light in weight and can be easily carried by a person or transported in a car. The screen can also be hinged or slidably attached to a variety of containers such as a closet or a cabinet to have storage functions, or be slidably mounted to a window to have shielding functions.

The embodiments described in detail for exemplary purposes are of course subject to many different variations in structure, design and application. Since many varying and different embodiments may be made within the scope of the inventive concepts herein taught, and since many modifications may be made in the embodiment herein detailed in accordance with the descriptive requirements of the law, it is to be understood that the detailed embodiments provided above are to be interpreted as illustrative and not in a limiting sense.

I claim:

1. A screen, comprising
   a laminar member capable of being rolled up;
   at least two frame members with adjustable lengths adapted to be located in a periphery of the laminar member when the laminar member is in an unrolled condition; and
   a mechanism associated with each end of the frame members whereby the frame members may be connected together, the mechanism including a cam arrangement by which relative positions of the frame members may be adjusted to vary tension in the laminar member.

2. A screen as claimed in claim 1, in which the cam arrangement comprises
   a cam surface carried on one end of a first frame member; and
   a screw member carried on one end of a second frame member, such that rotation of the screw member causes movement of the frame members to vary tension in the laminar member applied by the frame members.

3. A decorative screen assembly, comprising
   a surrounding frame having at least two frame members with adjustable lengths;
   a laminar member attached to the surrounding frame; and
   a cam arrangement for connecting the frame members, wherein relative positions of the frame members may be adjusted to vary tension in the laminar member.

4. The decorative screen assembly according to claim 3, wherein the laminar member has a graphic display for decorative purpose.

5. The decorative screen assembly according to claim 3, wherein the laminar member is held in tension on the surrounding frame.

6. The decorative screen assembly according to claim 3, wherein there are a total of four frame members connected together by the cam arrangement.

7. The decorative screen assembly according to claim 3, wherein the frame members are connected together to form a geometric shape.

8. The decorative screen assembly according to claim 7, wherein the geometric shape is a rectangle.

9. The decorative screen assembly according to claim 3, wherein the relative positions of the frame members are adjusted so that the laminar member is flat and in a single plane.

10. The decorative screen assembly according to claim 3, wherein the relative positions of the frame members are adjusted so that the laminar member is held in a curved shape.

11. The decorative screen assembly according to claim 3, wherein the cam arrangement comprises
    a cam member attached to one end of a first frame member; and
    a screw member attached to one end of a second frame member, wherein rotation of the screw member causes movement of the frame members to vary tension in the laminar member applied by the frame members.

12. The decorative screen assembly according to claim 11, wherein the cam member has an inclined cam surface, wherein movement of the screw member against the cam surface will cause the first frame member to move in a first direction, and the second frame member to move in a second direction perpendicular to the first direction.

13. The decorative screen assembly according to claim 11, wherein the screw member comprises an Allen key connecting to a captive screw.

14. The decorative screen assembly according to claim 11, wherein the cam arrangement further comprises an end cap which fits in the end of the second frame member, wherein the screw member is threaded into the end cap.

15. The decorative screen assembly according to claim 11, wherein the cam member has a spigot member fitting into the end of the first frame member.

16. The decorative screen assembly according to claim 12, wherein
    the screw member comprises an Allen key and a captive screw; and
    the cam surface is provided with a slot, through which the Allen key is adapted to be inserted into the slot and to engage an end of the captive screw.

17. The decorative screen assembly according to claim 3, wherein the frame members are attached to the laminar member through pockets formed around the laminar member.

18. The decorative screen assembly according to claim 3, wherein the frame members are adapted to be adjusted in length so that size of the screen assembly can be adjusted.

19. The decorative screen assembly according to claim 3, wherein the frame members are adapted to be adjusted in length so that shape of the screen assembly can be adjusted.

20. The decorative screen assembly according to claim 3, wherein the laminar member is replaceable.

21. The decorative screen assembly according to claim 3, further comprising attachment means so that the decorative screen unit is adapted to be attached to a wall.

22. The decorative screen assembly according to claim 3, further comprising attachment means so that the decorative screen unit is adapted to be hinged to a container.

23. The decorative screen assembly according to claim 3, further comprising attachment means so that the decorative screen unit is adapted to be slidably attached to a container.

24. The decorative screen assembly according to claim 22, wherein the container is a closet.

25. The decorative screen assembly according to claim 3, further comprising supporting means so that the decorative screen unit is adapted to stand on a ground.

26. The decorative screen assembly according to claim 3, wherein the decorative screen unit is used as a sun blind.

27. The decorative screen assembly according to claim 3, wherein the decorative screen unit is used as a window privacy partition.

28. The decorative screen assembly according to claim 3, wherein the laminar member is made from recyclable polypropylene.

29. The decorative screen assembly according to claim 3, wherein the laminar member is a map.

30. The decorative screen assembly according to claim 3, wherein the laminar member is a flag.

31. The decorative screen assembly according to claim 3, wherein the laminar member is translucent.

32. The decorative screen assembly according to claim 3, wherein the laminar member allows ventilation.

33. The decorative screen assembly according to claim 22, wherein the container comprises a hollow framework.

34. The decorative screen assembly according to claim 33, wherein the hollow framework is made of wire.

35. The decorative screen assembly according to claim 33, wherein the hollow framework is made of thin but strong metal wire so that the framework is light in weight.

36. The decorative screen assembly according to claim 33, wherein the container further comprises at least one rack for organized storage of objects.

37. The decorative screen assembly according to claim 33, wherein the framework has at least one side surface in a right angle triangular shape, so that the framework is adapted to fit into a wall corner.

38. A decorative storage unit, comprising:
  a container having means whereby it can be mounted on a wall for storing and organizing household articles;
  a door hinged to the container so that in a closed position the door conceals the container and in an open position allows access to an interior of the container; and
  a graphic display carried by an outer surface of the door so that when the door is in the closed position, the graphic display is visible, wherein
    the container comprises a hollow framework made of wire so that the container is light in weight.

39. A unit as claimed in claim 38, in which the door comprises a flexible laminar member held in tension on a surrounding frame.

40. A unit as claimed in claim 38, in which the door is made of a single membrane of translucent material.

41. A unit as claimed in claim 38, in which the container houses means for illuminating the interior of the storage unit and a rear surface of the door when closed.

42. A unit as claimed in claim 38, in which the container is tapered for the purpose of accumulative stacking during transit.

43. A unit as claimed in claim 38, in which the density of the door structure prevents finger injury when trapped during an action of closing.

44. A unit as claimed in claim 38, wherein
  when the door is in the closed position the container will be concealed in a front view and substantially concealed in a side view, for decorative purpose.

45. A method of making a decorative screen assembly, comprising the steps of
  fixing a first frame member and a second frame member to two opposite sides of a laminar member of a rectangular shape; and
  attaching a third frame member and a fourth frame member, through a cam arrangement, to the first frame member and the second frame member to form a rectangular frame to support the laminar member, wherein relative positions of the frame members may be adjusted by the cam arrangement to vary tension in the laminar member, and wherein lengths of the frame members are adjustable so that size of the decorative screen assembly can be adjusted.

46. The method according to 45, wherein the laminar member is capable of being rolled up, along with the first frame member and the second frame member, for easiness of packing and transportation.

47. The method according to 45, wherein a graphic display is applied to the laminar member for decorative purpose.

48. The method according to 45, wherein a graphic display is applied to the laminar member by screening printing.

49. The method according to 45, wherein a graphic display is applied to the laminar member by hand drafting.

50. The screen as claimed in claim 1, wherein lengths of the frame members are adjustable so that size of the screen can be adjusted.

51. The decorative screen assembly according to claim 3, wherein lengths of the frame members are adjustable so that size of the decorative screen assembly can be adjusted.

52. The decorative storage unit according to claim 38, wherein the graphic display is adapted to be changed or adjusted.

53. The decorative storage unit according to claim 38, wherein the door comprises frame members in light weight.

54. The decorative storage unit according to claim 47, wherein the graphic display is adapted to be changed or adjusted.

* * * * *